US007664622B2

(12) United States Patent
Ruetsch

(10) Patent No.: US 7,664,622 B2
(45) Date of Patent: Feb. 16, 2010

(54) USING INTERVAL TECHNIQUES TO SOLVE A PARAMETRIC MULTI-OBJECTIVE OPTIMIZATION PROBLEM

(75) Inventor: Gregory R. Ruetsch, West Linn, OR (US)

(73) Assignee: Sun Microsystems, Inc., Santa Clara, CA (US)

(*) Notice: Subject to any disclaimer, the term of this patent is extended or adjusted under 35 U.S.C. 154(b) by 754 days.

(21) Appl. No.: 11/481,747

(22) Filed: Jul. 5, 2006

(65) Prior Publication Data

US 2008/0010044 A1    Jan. 10, 2008

(51) Int. Cl.
*G06F 17/10* (2006.01)
(52) U.S. Cl. .......................................... 703/2
(58) Field of Classification Search ................ 703/2; 706/45; 705/7; 435/7.1; 250/363.02; 701/200; 700/44
See application file for complete search history.

(56) References Cited

U.S. PATENT DOCUMENTS

| 7,139,741 | B1* | 11/2006 | Benjamin .................... 706/45 |
| 7,391,026 | B2* | 6/2008 | Trinkaus et al. ......... 250/363.02 |
| 2004/0161796 | A1* | 8/2004 | Gustafsson et al. ......... 435/7.1 |
| 2005/0177530 | A1* | 8/2005 | Jin et al. .................... 706/45 |
| 2005/0197875 | A1* | 9/2005 | Kauffman .................... 705/7 |
| 2005/0216182 | A1* | 9/2005 | Hussain et al. ............. 701/200 |
| 2006/0247798 | A1* | 11/2006 | Subbu et al. ................. 700/44 |
| 2008/0010044 | A1* | 1/2008 | Ruetsch ..................... 703/2 |

OTHER PUBLICATIONS

Coello,C., "An updated survey of GA based Multiobjective optimization techniques", ACM 2001.*
Medeiro et al., "A statistical optimization based approach for automated sizing of analog cells", ACM 1994.*
Raquel et al., "An effective use of crowding distance in multiobjective particle swarm optimization", ACM 2005.*
Coello et al., "Handling multiple objectives with particle swarm optimization", IEEE, 2004.*
Knowles et al., "Approximating the nondominated front using Pareto archived evolution strategy", Evolutionary computation, 2000.*

* cited by examiner

*Primary Examiner*—Paul L Rodriguez
(74) *Attorney, Agent, or Firm*—Park, Vaughan & Fleming, LLP

(57) ABSTRACT

A system that solves a parametric multi-objective optimization problem in a combined design space and parameter space using interval techniques is described. The design space contains design-space variables fixed for a selected design; the parameter space contains variable parameters for the selected design. Multiple-objective functions are specified for optimization. The system initializes a design-variable box spanning the design space and performs interval optimization process on the parameter space by subdividing the design-variable box into design-variable sub-boxes, and iteratively: (1) determining parametric Pareto fronts for a design-variable sub-box using an interval optimization technique; (2) comparing parametric Pareto fronts associated with a set of design-variable sub-boxes and determining the parametric Pareto fronts certainly dominated by other parametric Pareto fronts; (3) eliminating the design-variable sub-boxes associated with the certainly dominated Pareto fronts; and (4) subdividing remaining design-variable sub-boxes. An optimized solution is produced from the remaining design-variable sub-boxes and the associated parametric Pareto fronts.

23 Claims, 5 Drawing Sheets

USING INTERVAL TECHNIQUES TO SOLVE A PARAMETRIC MULTI-OBJECTIVE OPTIMIZATION PROBLEM

RELATED APPLICATION

The subject matter of this application is related to the subject matter in a co-pending non-provisional application by the same inventor as the instant application entitled, "Using Interval Techniques to Solve a Multi-objective Optimization Problem," having Ser. No. 11/029,609, and filing date Jan. 4, 2005.

BACKGROUND

1. Field of the Invention

The present invention relates to techniques for performing interval computations within computer systems. More specifically, the present invention relates to a method and an apparatus for solving a parametric multi-objective optimization problem in a combined design space and parameter space using interval techniques within a computer system.

2. Related Art

In many real-world optimization problems, there are often several objectives that one would like to optimize. In such cases, rarely do the optima of each objective coincide. Hence, one is left with tradeoffs between the individual objectives that must be incorporated in the solution. The goal of multi-objective optimization is then to determine a set of points that describe the optimal trade-offs between objectives.

An example of multi-objective optimization is that of minimizing price and maximizing performance. A common metric associated with these two objectives is the price-performance ratio. This number, however, oversimplifies the optimization problem. This oversimplification lies in the implicit assumption that a unit of price is equal to a unit of performance, which in general is not the case. For example, a college freshman and a national lab would most likely weight these two objectives differently when purchasing a computer. A more insightful approach to the problem is depicted in FIG. 1, which shows the price and runtime (inverse performance) of a set of points representing (fictitious) computers. Expressed in this manner, one would like to minimize each objective.

Unfortunately, minimizing both objectives simultaneously is generally not possible, and is not the case in this example. The best one can do is come up with an optimal trade-off. This trade-off is optimal in the sense that it is not possible to improve one objective without degrading at least one other objective. The filled circles in FIG. 1 are points which exhibit this optimal trade-off between the multiple objectives, which comprise the "Pareto front." Obtaining the Pareto front is one of the goals of multi-objective optimization, both in identifying optimal points and in providing a sensitivity analysis. This sensitivity analysis considers the shape of the Pareto front. Convex portions of the Pareto front (points which lie on the convex hull of all points) indicate an ability to satisfy all objectives relative to regions of the Pareto front which are non-convex (the "indented" region of Pareto front in FIG. 1).

In addition to determining the Pareto front, another goal of multi-objective optimization is to identify values of the objective functions' independent variables which are mapped to points on the Pareto front. In our example, processor speed, memory, system architecture, etc., are all independent variables (perhaps constrained) of both price and performance objective functions. One would like to know which sets of these independent variables map to points on the Pareto front. Such sets are termed "Pareto optimal sets."

Previously, we have proposed using interval techniques to solve multi-objective optimization problems (see "Method and Apparatus for Using Interval Techniques to Solve a Multi-objective Optimization Problem," with patent application Ser. No. 10/691,868, and filing date Oct. 22, 2003 by the same inventor as the present application; and the related patent, currently issued as U.S. Pat. No. 7,295,956 on Oct. 24, 2007).

Note that these previous interval techniques capture all points on a Pareto front in the objective space, as well as the corresponding points of a Pareto optimal set in the design space. However, these techniques were specifically designed to solve the type of multi-objective optimization problems which depend exclusively on "design-space variables," which have fixed values once a particular design is chosen. However, in real-world design-optimization problems, there exists another type of multi-objective optimization problem where the objective functions depend on both the design-space variables and "parameters," which are variables that can be modified after a particular design is chosen. These types of design-optimization problems are referred to as "parametric multi-objective optimization problems," while the previous multi-objective optimization problems can be analogously referred to as "nonparametric multi-objective optimization problems." While both types of multi-objective optimization problems have important real-world applications, the parametric problems are typically significantly more complicated to solve, and hence have not been widely studied. We now illustrate this type of problems with the following example: an optimal airfoil design.

While aerodynamic shape optimization is a very complicated design problem with many objectives and constraints, we will look at a simplified case. We are concerned with two objective functions: minimizing the aerodynamic drag and maximizing the lift of the airfoil. Note that both of these objectives are functions of many variables related to the geometry of the airfoil. Most of these variables will be fixed for a particular design, such as the camber, length and thickness of the airfoil. Such variables are the aforementioned design-space variables.

However, some quantities, such as aileron or flap angle, can be modified after a design is selected, hence are not fixed once the design is chosen. We refer to these quantities as "parameters" instead of the design-space variables. Note that a parameter can take on a range of values during operation of a chosen design, hence a parameter is also referred to as an "operational variable." For example, the flap angle of the airfoil can be adjusted to different positions for optimal flight conditions during different stages of a flight operation. The question is then how to take into account these parameters such the flap angle into the design-optimization process.

One approach would be simply treat these parameters as some other design variables, and subsequently determine the Pareto front over the entire design space. At the other end of the spectrum, one could determine the Pareto front for a particular set, or sets, of parameters individually. Unfortunately, both of these approaches are flawed: the latter approach significantly undermines the effectiveness of multi-objective optimization; and the former approach fails to leverage the operational variability of some parameters when Pareto fronts are used to select designs.

Hence, what is needed is a technique for solving parametric multi-objective optimization problems which distinguishes between design-space variables and parameters without the above-described problems.

SUMMARY

One embodiment of the present invention provides a system that solves a parametric multi-objective optimization problem in a combined design space and parameter space using interval techniques, wherein the design space contains design-space variables which are fixed for a selected design, and wherein the parameter space contains parameters which are variables for the selected design. During operation, the system first receives a design-optimization problem at a computer system, wherein the problem is specified by multiple-objective functions which are to be optimized in the combined design space and parameter space. Next, the system initializes a design-variable box spanning the design space. The system then performs an interval optimization process on the parameter space by subdividing the design-variable box in the design space into design-variable sub-boxes, and iteratively: (1) determining a parametric Pareto fronts for a design-variable sub-box using an interval optimization technique; (2) comparing a set of parametric Pareto fronts associated with a set of design-variable sub-boxes to determine which parametric Pareto fronts are certainly dominated by other parametric Pareto fronts; (3) eliminating the design-variable sub-boxes associated which the parametric Pareto fronts which are certainly dominated by other parametric Pareto fronts; and (4) subdividing remaining design-variable sub-boxes. After the interval optimization process, the system produces an optimized solution for the design problem from the remaining design-variable sub-boxes and the associated parametric Pareto fronts.

In a variation on this embodiment, prior to performing the interval optimization process on the parameter space, the system determines a global Pareto front for the combined design space and parameter space by solving a nonparametric multiple-objective optimization problem, wherein the parameters are treated as additional design variables. The global Pareto front results in a solution for the parametric multiple-objective optimization problem if one of the following cases occurs: (1) the global Pareto front results from a single point in the combined design space and parameter space; (2) the global Pareto front results from a single point in the design space but different points in the parameter space; or (3) the global Pareto front results from a single point in the parameter space but different points in the design space.

In a further variation on this embodiment, if the global Pareto front results in a single value for a variable in the combined design space and parameter space, the system can remove the variable from the optimization problem.

In a further variation on this embodiment, the global Pareto front forms an upper bound for the parametric multiple-objective optimization problem.

In a variation on this embodiment, the system determines the parametric Pareto front for the design-variable sub-box by: (1) subdividing the parameter space into parameter-space sub-boxes; and (2) performing an iterative interval optimization process on the parameter-space sub-boxes until predetermined stopping criteria are met.

In a further variation on this embodiment, the system performs the iterative interval optimization process by: (1) evaluating the multiple-objective functions on the parameter-space sub-boxes; (2) applying a set of criteria to eliminate some of the parameter-space sub-boxes; and (3) subdividing remaining parameter-space sub-boxes.

In a further variation on this embodiment, the predetermined stopping criteria can include: (1) the change during successive evaluations on the multiple-objective functions as a result of further subdividing the remaining sub-boxes is less than a predetermined amount; (2) a predetermined maximum number of iterations is reached; or (3) the largest size of any remaining sub-box is below a predetermined value.

In a further variation on this embodiment, the set of criteria to eliminate some of the parameter-space sub-boxes includes: (1) a direct comparison of the evaluation results on the multiple-objective functions; and (2) a gradient technique.

In a variation on this embodiment, the system represents a parametric Pareto front for a design-variable sub-box with a finite set of boxes which contains the actual parametric Pareto front for the parametric multi-objective optimization problem.

In a further variation on this embodiment, a parametric Pareto front $P(A)$ associated with a design-variable sub-box A certainly dominates a parametric Pareto front $P(B)$ associated with a design-variable sub-box B, if for every box $V \in S(B)$ there is at least one box $U \in S(A)$ such that:

$$F_i(A; U) \leq F_i(B; V), \text{ wherein } i=1, \ldots, n; \text{ and}$$

there is at least one combination of $V \in S(B)$ and $U \in S(A)$ such that:

$$F_i(A; U) < F_i(B; V) \text{ for some } i \in \{1, \ldots, n\},$$

wherein $S(A)$ and $S(B)$ are the Pareto optimal sets associated with the parametric Pareto fronts $P(A)$ and $P(B)$, respectively, and wherein $F_i$ are the set of multiple-objective functions.

In a variation on this embodiment, the system applies a set of subjective elimination criteria to further eliminate remaining parametric Pareto fronts and the associated design-variable sub-boxes.

DETAILED DESCRIPTION

Figure 1:
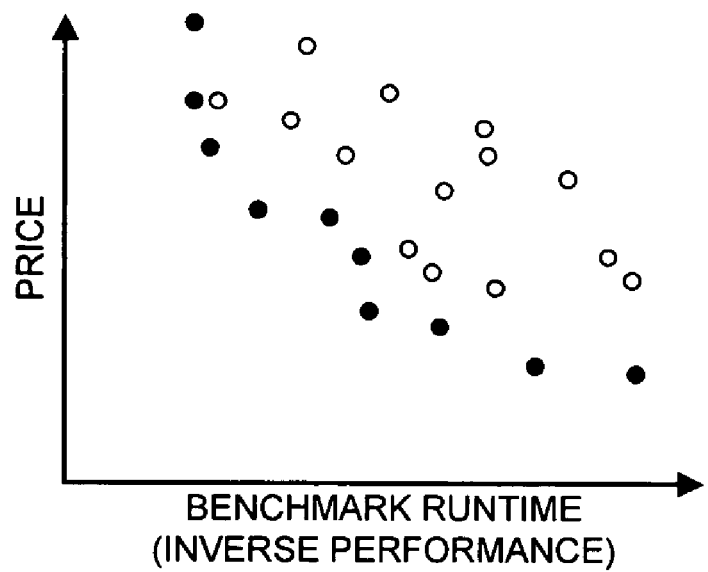
FIG. 1 presents a graph of price versus performance for computer systems.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Interval Computations

Note that interval computation provides an automatic means for bounding roundoff error. Rather than representing a number by a single floating point value, which may or may not exist in machine representation, an interval represents a number by machine representable lower and upper bounds which contain the desired value. Interval computation uses directed or outward rounding such that the resulting interval always contains the mathematical result. In addition to bounding roundoff error, interval computation provides a rich environment for performing set theoretic operations. One of the most powerful aspects of interval computation, however, is that in performing a single function evaluation over an interval, one obtains rigorous bounds of that function over the entire interval. Depending on the value of these bounds, one can prove or disprove certain conjectures. We leverage this feature in multi-objective optimization problems to eliminate boxes in which we can prove no point is Pareto optimal. In doing so, we capture all Pareto optimal points. In essence, intervals allow one to develop computer techniques, which deal with continua rather than discrete points, and as a result one can perform proofs via computers.

Multi-Objective Concepts and Definitions

In this section, we briefly formalize concepts and define terms used in multi-objective optimization. We begin by presenting an analytical example, and once the multi-objective optimization concepts have been established through this example, we generalize the concepts.

Consider a case with two objective functions which represent the distance of a point $(x_1, x_2)$ from points $(-\frac{1}{2}, 0)$ and $(\frac{1}{2}, 0)$, $$f_1(x_1, x_2) = \sqrt{\left(x_1 + \frac{1}{2}\right)^2 + x_2^2} \quad f_2(x_1, x_2) = \sqrt{\left(x_1 - \frac{1}{2}\right)^2 + x_2^2} \quad (1)$$

which we want to minimize in a two-dimensional domain $(x_1, x_2) \in ([-1, 1], [-\frac{1}{2}, \frac{1}{2}])$.

The individual minima of $f_1$ and $f_2$ are the points $(-\frac{1}{2}, 0)$ and $(\frac{1}{2}, 0)$, respectively, so the objectives are minimized at different points in the domain, as is generally the case in multi-objective optimization. What we hope to achieve for such a set of objective functions is an optimal trade-off in objectives. This optimal trade-off can be determined by projecting all the points in this domain into objective space, as depicted in FIG. 2.

Figure 2:
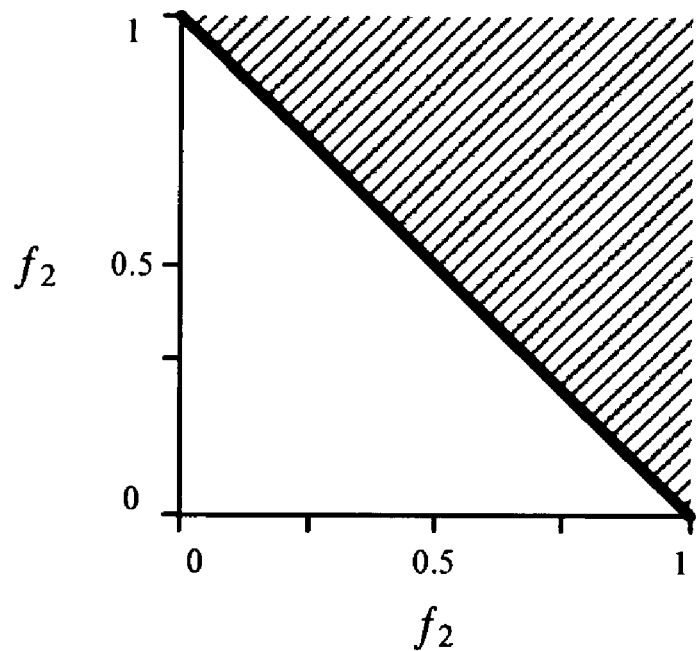
FIG. 2 depicts a Pareto front.

In FIG. 2 the projection of points $(x_1, x_2) \in ([-1, 1], [-\frac{1}{2}, \frac{1}{2}])$ into objective space $(f_1, f_2)$ is indicated by the crosshatched region. (Some points are projected above and to the right of the crosshatched region). The points which lie on the bold line comprise the Pareto front for this pair of functions. Points on the Pareto front are nondominated, in that no point exists that can improve one objective without degrading the other.) When projected to objective space, the points in this domain fill the region above the diagonal line. The diagonal line is called the "Pareto front" and represents the optimal trade-off in that there can be no improvement towards minimizing one objective which doesn't adversely affect the other objective. (Since the minimum of each objective is zero, this condition can be interpreted geometrically by requiring the rectangle whose diagonal connects the origin and the point in question to be empty.) On the other hand, all points which lie above the Pareto front can simultaneously improve both objectives by moving towards the Pareto front.

Figure 3:
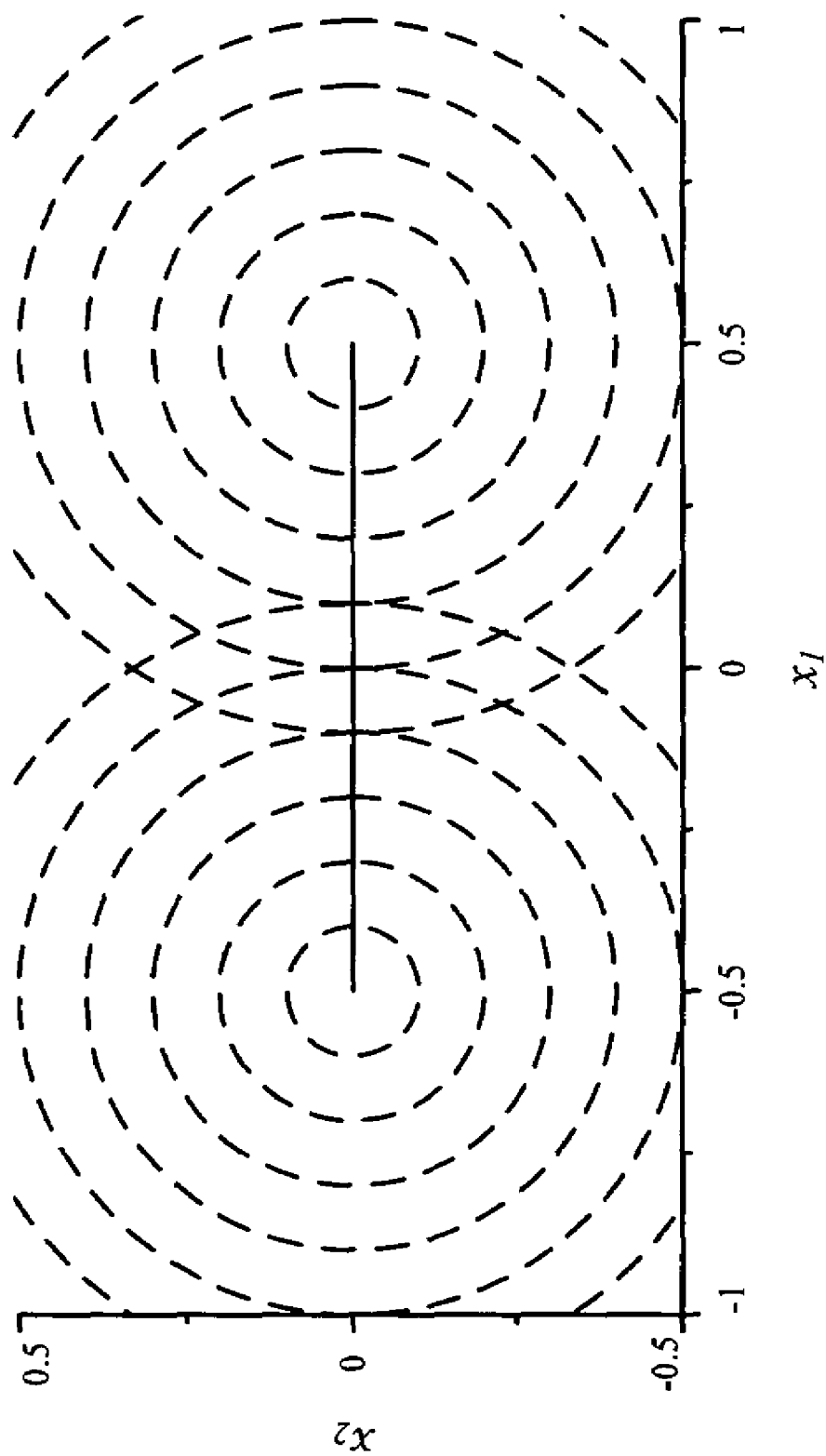
FIG. 3 illustrates a Pareto optimal set.

In addition to determining the Pareto front, the corresponding points in the domain $(x_1, x_2)$ which project onto the Pareto front are desired. Such a point is called "Pareto optimal," and the collection of all such points the "Pareto optimal set." For our example, the Pareto optimal set includes all points in the line segment connecting the two individual minima, depicted in FIG. 3. FIG. 3 illustrates contours (dashed lines) and the Pareto optimal set (solid line) for functions $f_1$ and $f_2$ in Equation (1). The value of these functions are the distances from points $(-\frac{1}{2}, 0)$ and $(+\frac{1}{2}, 0)$, respectively, which result in the circular contours. The Pareto optimal set for this example comprises the points on the line connecting the two individual minima, and projects into the Pareto front in objective space. Note that any point in the domain that is not in the optimal Pareto set can improve both objectives by moving along a path towards the line which comprises the Pareto optimal set.

With the concepts of Pareto front and Pareto optimal set for the above analytical expressions established, we now turn our attention to generalizing these concepts to a case with n objective functions in a D-dimensional domain. In order to generalize the Pareto front to n dimensions, it is useful to establish the concept of dominance. If u and v are n-dimensional vectors, then under minimization u is said to dominate v, denoted as u≺v, if:

$u_i \leq v_i, i=1, \ldots, n;$ and $u_i < v_i$ for some $i \in \{1, \ldots, n\}$.

Applying dominance to the Pareto concepts, we say the Pareto front contains points which are nondominated solutions: solutions where an improvement in one objective cannot be made without adversely affecting at least one other objective. Generally, if we wish to minimize n objectives $\{f_1, \ldots, f_n\}$ within a particular domain $\Omega$ of a D-dimensional space $x=(x_1, \ldots, x_D)$, and we define an objective vector $f(x)=(f_1(x), \ldots, f_n(x))$, then a point $x \in \Omega$ is Pareto optimal if:

$f(x') \not\prec f(x) \forall x' \in \Omega$ (2)

The definition of Pareto optima in Equation (2) utilizes the function evaluations. This point definition becomes the basis for the interval direct-comparison method in a following section.

Interval Concepts

Interval methods grew out of the desire to control roundoff error in floating point computations. The idea is that rather than using a single floating point value to represent a number, which would incur an error if the number is not machine representable, a number is represented by upper and lower bounds which are machine representable. Interval arithmetic is performed in a way to guarantee containment. Intervals are described in more detail in U.S. Pat. No. 6,629,120, entitled "Method and Apparatus for Performing a Mask-Driven Interval Multiplication Operation," by inventors William G. Walster and Dmitri Chiraev.

In addition to operators for arithmetic and function evaluation, intervals have a rich set of relational operators. There are certainly true operations, for example:

$X^c < Y \Leftrightarrow x < y \forall x \in X$ and $y \in Y$ as well as possibly true operations:

$$X^p < Y \Leftrightarrow \exists x \in X \text{ and } y \in Y | x < y$$

These same ideas hold for all relational operators.

Now that some basic concepts of interval arithmetic and computation have been discussed, we apply these concepts to multi-objective optimization, starting with the interval definition of dominance.

Interval Dominance and the Direct-Comparison Method

We can extend the notions of certainly and possibly used to define the basic interval relational operators to that of dominance. An interval vector $U=(U_1(x), \ldots, U_n(x))$ certainly dominates an interval vector V according to the following definition:

$$U \overset{c}{\prec} V \Leftrightarrow u \overset{c}{\prec} v \; \forall u \in U \text{ and } v \in V$$

In terms of the infima and suprema of the components of U and V, we say that $U \overset{c}{\prec} V$ if:

$$\overline{u}_i \leq \underline{v}_i \; i=1, \ldots, n \text{ and}$$

$$\overline{u}_i < \underline{v}_i \text{ for some } i \in \{1, \ldots, n\}.$$

Likewise, U is said to possibly dominate V, denoted as $U \overset{p}{\prec} V$ if:

$$\underline{u}_i \leq \overline{v}_i \; i=1, \ldots, n.$$

One could apply the definition of certain dominance directly to obtain an interval technique for determining the Pareto front. One would simply search over a set of boxes covering the domain $\Omega$, and eliminate any boxes which were certainly dominated. Then the remaining boxes would be bisected, and the procedure is repeated until some stopping criterion is met.

While this method will work in that no Pareto optimal points will be eliminated, there are several disadvantages inherent in this method. The main disadvantage is that the number of comparisons to determine certain dominance grows rapidly with number of boxes. Performance-wise this becomes costly as the Pareto front is refined.

One aspect of this direct-comparison method that is both advantageous and disadvantageous is that it is a global method. This is disadvantageous with respect to parallelization in a clustered environment—some message passing is needed for comparison between all boxes within an iteration. The global nature of the direct-comparison method is advantageous in that it results in global Pareto optima. This is important since the interval version of the differential formulation produces all the local Pareto optima, and some consistency check is needed to eliminate those local optima which are not global. The direct-comparison method provides this consistency check.

Interval Dominance and the Gradient Method

In the direct-comparison technique described above, we used the concept of certain dominance through the evaluation of the objectives over intervals to eliminate boxes, which are certainly dominated, and therefore contain no Pareto optimal points.

A complimentary technique for solving the multi-objective problem utilizes an interval-differential formulation, wherein one again looks to develop a criterion which facilitates removing boxes which are certainly dominated, however this criterion is based on the objective function gradients. A detailed description of the gradient technique can be found in the related patent application Ser. No. 11/029,609, which is hereby incorporated by reference, so will not be recapitulated here. Interval versions of the direct-comparison technique, the gradient technique, and the combination of these two techniques are to be used in solving the parametric multi-objective optimization problem below.

Defining a Parametric Multi-Objective Optimization Problem

The parametric multi-objective optimization is concerned with determining an optimal trade-off between two or more objective functions, denoted as f or $f_i$, where $i=1, \ldots, N$, and where N is the number of objectives. These objective functions are dependent on two types of quantities: (1) those that are fixed once a design is selected, and (2) those that can be modified after a design is selected. We refer to the first type of quantities as "design-space variables," which are denoted by x or $x_i$, and the second type of quantities as "parameters," which are denoted as y or $y_i$. We then denote the functional dependence of the multiple objectives on the design-space variables and the parameters by f(x; y) or $f_i(x_1, \ldots, x_d; y_1, \ldots, y_p)$ where d and p are the number of design-space variables and parameters, respectively.

Again using our airfoil design problem as an example, our two objective functions f are: $f_1$—the aerodynamic drag on the airfoil and $f_2$—the lift of the airfoil, and both objective functions depend on a set of design-space variables and parameters. The design-space variables $x_i$ can include, but are not limited to, camber, length and thickness of the airfoil, which are fixed values for a selected design. On the other hand, the parameters $y_i$ can include, but are not limited to, aileron and flap angle, which can be changed/modified after the airfoil design is chosen. Note that the goal for the airfoil design problem is to determine an optimal trade-off between minimizing $f_1$—the aerodynamic drag, and maximizing $f_2$—the lift of the airfoil.

Once the parametric multi-objective optimization problem is defined, we can solve the problem in the combined design space and parameter space, wherein the design space contains the design-space variables, and wherein the parameter space contains the parameters. Before we apply interval techniques to the solution procedure, we describe the solution procedure in more detail below.

Obtaining a Global Pareto Front

During the first step of solving the parametric multi-objective optimization problem, we determine a global Pareto front in the combined design space and parameter space without distinguishing the two types of quantities. More specifically, we solve a nonparametric multiple-objective optimization problem, wherein the parameters are treated as additional design-space variables. In other words, we treat the objective functions $f_i(x_1, \ldots, x_d; y_1, \ldots, y_p)$ as $f_i(x_1, \ldots, x_d, y_1, \ldots, y_p)$ and proceed to obtain the global Pareto front using the procedure described in the related patent application.

Note that computing the global Pareto front achieves two purposes. Firstly, it creates an upper limit for the parametric multi-objective optimization problem, such that no subset of the parameter space can exceed, or dominate, any portion of this global Pareto front. Secondly, when solving for the global Pareto front where all quantities in the design space and parameter space are treated as independent variables, a number of resulting cases can provide the parametric problem with direct solutions. Consequently, one will not need to solve the parametric problem by treating design-space variables and parameters differently. These possible resulting cases of a global Pareto front are listed below.

If the global Pareto front contains a single point (which is a highly unlikely event), resulting from a single point in the combined design space and parameter space, then the corresponding point in the design space provides the optimal design for the parametric problem.

If the global Pareto front contains a set of points (which is almost always the case), and if all the points in the set of points result from a single point in the design space (but different points in the parameter space), then once again the particular design space point results in the optimal design.

On the other hand, if all points on the global Pareto front result from a single point in the parameter space (but different points in the design space), then the problem is essentially not a parametric problem (wherein all parameter values are fixed) and the global Pareto front is the "solution."

Generally, if the global Pareto front results in a single value for any single variable (in either the design space or the parameter space), then the variable can be removed from the design problem, as this variable essentially becomes a fixed coefficient.

Determining a Parametric Pareto Front

After establishing the global Pareto front by treating parameters as additional design-space variables, we can process to compute parametric Pareto fronts. Before doing so, we summarize the definition of dominance in the nonparametric case for comparison purpose.

For the nonparametric multi-objective optimization, a point in design space can be eliminated if its corresponding point in objective space is dominated. More specifically, if we have two design space points, x=a and x=b, which are mapped to objective functions f(a) and f(b), then under minimization rules, f(a) is said to dominate f(b), if:

$$f_i(a) \leq f_i(b) \ i=1, \ldots, n$$

$$\text{and } f_i(a) < f_i(b) \text{ for some } i \in \{1, \ldots, n\},$$

where n is the number of objectives. These relations can be expressed in a condensed form as $f(a) \prec f(b)$. If this relation is satisfied, the design point b can be eliminated from consideration. Conversely, we can say a point x in some design space $\Omega$ is Pareto optimal if:

$$f(x') \not\prec f(x) \ \forall x' \in \Omega.$$

Returning to the parametric problems, a given point in the design space, rather than mapping to a single point in the objective space, maps to a manifold of points in the objective space. The manifold of points in the objective space is produced by varying the parameters in the parameter space for the given design space point. As a result, assessing dominance of different points in the design space is more complicated and typically involves two steps.

In the first step, we determine a Pareto front associated with these manifold of points for a given point in the design space. Note that a Pareto optimal set associated with this Pareto front is formed from the points in the parameter space. Hence, the corresponding Pareto front is called a parametric Pareto front. Furthermore, this step results in a range of parametric Pareto fronts which are corresponding to a range of design space points.

In the second step, we assess dominance between the parametric Pareto fronts. Note that the main difference here is that in parametric multi-objective optimization we evaluate dominance between entire Pareto fronts in the objective space, rather than between points in the objective space.

We now describe the first step in more-detail below.

Generally, the manifold of points in the objective space created by spanning parameter space $\Pi$ for a given point x in design does not form a Pareto front. Hence, the first step of comparing design space points is to determine the Pareto front associated with a particular design point. For example, consider a design point x=a along with parameters y where $y \in \Pi$. Let's denote the Pareto front associated with a as P(a), which is correspondent to points in parameter space $\Pi$ that are Pareto optimal. For the given design point x=a, a point y in parameter space $\Pi$ is Pareto optimal if:

$$f(a; y') \not\prec f(a; y) \ \forall y' \in \Pi.$$

Note that this definition is essentially the same as in the nonparametric problem, with the parameters (i.e., y) act as design-space variables.

Note that, in a nonparametric multi-objective optimization problem, the objective functions map points in the Pareto optimal set in the design space to the associated Pareto front in the objective space. In contrast, in a parametric multi-objective optimization problem, the points on a parametric Pareto front P(a) associated with a particular design point a, are mapped from points in parameter space to the Pareto optimal set associated with a, S(a).

Assessing Dominance in Parametric Pareto Fronts

After the parametric Pareto fronts for various design points have been determined, we then compare these Pareto fronts to determine if some are dominated by others, and thus delete the dominated Pareto fronts. Note that in this process we consider dominated Pareto fronts rather than dominated points. Although it is possible for a point on one parametric Pareto front to dominate a point on another parametric Pareto front, in the context of parametric optimization problems, such dominance does not indicate that one associated design point is better than the other associated design point.

In one embodiment of the present invention, dominance between parametric Pareto fronts can be defined as: a Pareto front P(a) dominates another Pareto front P(b), which is denoted by $P(a) \prec P(b)$, if for every point $q \in S(b)$, there is at least one point $p \in S(a)$ such that:

$$f_i(a; p) \leq f_i(b; q) \ i=1, \ldots, n$$

and there is at least one combination of $q \in S(b)$ and $p \in S(a)$ such that $$f_i(a; p) < f_i(b; q) \text{ for some } i \in \{1, \ldots, n\},$$

wherein S(a) and S(b) are the Pareto optimal sets associated with the parametric Pareto fronts P(a) and P(b), respectively.

Eliminating Pareto Fronts Based on Subjective Measures

For nonparametric multi-objective optimization problems, the optimal solutions form a single Pareto front. In the parametric case, the solution can comprise a set of Pareto fronts corresponding to different design space points. This solution can most likely include an infinite number of Pareto fronts, and also include Pareto fronts generated from continuous regions in the design space. While dominance as described above is an objective measure to eliminate design space points, it may be desirable to augment this criterion with others to further reduce the solution set. These other measures may be constraints, but more likely will be subjective measures of performance comparing the parametric and global Pareto fronts. For example, measures such as maximum distance between two Pareto fronts and coverage of the global Pareto front can be used. Such measures are highly problem specific and will not be discussed further in this general context.

Performing a Parametric Multi-Objective Optimization Using Intervals

To summarize the above-described solution procedure, it generally includes choosing design space points, creating parametric Pareto fronts, and applying the criteria to eliminate designs. Note that a sampling technique is typically used in the design space to yield a set of design points. However, sampling the design space makes the entire solution procedure unreliable. This is due to the fact that a parametric multi-objective optimization is essentially a nested nonparametric multi-objective optimization process, so that any lack of rigor which occurs in a nonparametric process can be significantly amplified when such nonparametric process is involved in the parametric case. Hence, it is desirable to apply an interval computation method in the solution procedure to take advantage of the rigor offered by using the intervals.

Note that the main differences between point-based methods and interval methods are that the interval methods deal with boxes rather than individual points, and sets of boxes rather than lines or curves. Additionally, one does not need to sample a design space in the interval methods. More specifically, a continuous region in the design space can be decomposed into a finite set of boxes rather than an infinite set of points.

We describe a detailed procedure of performing a parametric multi-objective optimization using interval techniques below.

Determining the Global Pareto Front Using Intervals

As mentioned above, we treat the parametric multi-objective optimization problem as a nonparametric multi-objective optimization problem where the parameters are treated as additional design variables. We then determine the global Pareto front for the combined design space and parameter space. Mathematically, if we denote interval boxes of design-space variables as $X_i$ where i=1, ..., d, interval boxes of parameters as $Y_j$ where j=1, ..., p, and objective functions evaluated over these variables and parameters as $F_i(X_1, ..., X_d, Y_1, ..., Y_p)$, then we need to solve a generic multi-objective optimization problem to get a representation of the global Pareto front for $F_i(X_1, ..., X_d, Y_1, ..., Y_p)$. This representation of the Pareto front comprises a finite set of boxes which are guaranteed to include the Pareto front for the nonparametric problem. Note that we use capitalized symbols of F, X, and Y here in order to differentiate with the point-based methods (which used the lower cases as f, x, and y).

Figure 4:
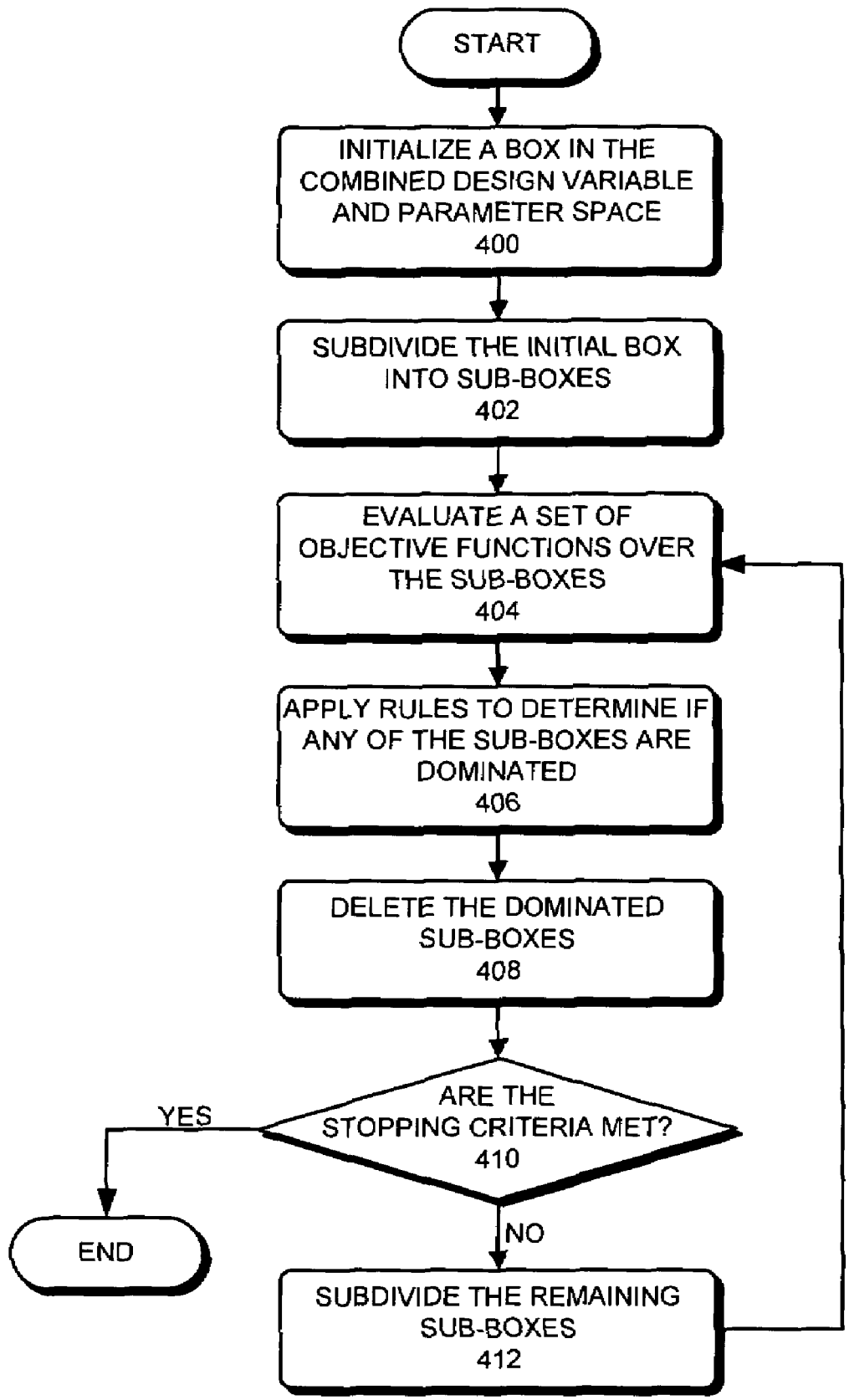
FIG. 4 presents a flowchart illustrating an optimization process for determining the global Pareto front using an interval technique in accordance with an embodiment of the present invention.

FIG. 4 presents a flowchart illustrating a process for determining the global Pareto front using an interval technique in accordance with an embodiment of the present invention.

The process starts by initializing a domain of interest in the combined design space and parameter space (step 400). For example, if we are interested in a design domain $(D_1, ..., D_d)$ and a parameter domain $(P_1, ..., P_p)$, we initialize the domain of computation with a box in the combined design space and parameter space of $(X_1, ..., X_d, Y_1, ..., Y_p)=(D_1, ..., D_d, P_1, ..., P_p)$.

Next, the process subdivides the initial box into sub-boxes (step 402). In one embodiment of the present invention, subdividing the initial box splits the box into two sub-boxes. The process subsequently evaluates the objective functions F over these sub-boxes (step 404).

The process then applies rules to determine if any of the sub-boxes are dominated by another sub-box (step 406). Specifically, the process uses aforementioned direct-comparison techniques and/or gradient techniques to determine if any of these sub-boxes are certainly dominated. The process subsequently deletes such dominated sub-boxes (step 408).

Next, the process determines if user specified stopping criteria are met (step 410). If not, the process subdivides the remaining sub-boxes (step 412) and returns to step 404. The process then repeats steps 404 to 412 until the user specified stopping criteria are met. Such user specified stopping criteria can include, but are not limited to, when a predetermined maximum number of iterations is reached, or the largest size of any remaining sub-box is below a predetermined box size.

Determining the Parametric Pareto Front Using Intervals

An interval representation of a parametric Pareto front associated with a particular design variable box $X_i=A_i$ can be determined in a manner similar to that of determining the global Pareto front in an iterative process. However, in this process, only the parameters are treated as independent variables (the design variables are fixed with values $A_i$). More specifically, box splitting only occurs in parameter space, and the gradient technique, if used for box elimination, performs the derivatives only with respect to the parameters.

Special attention needs to be applied to the stopping criteria for the iterations. Because the design variable box $A_i$ may be quite large, it may not be necessary to iterate and subdivide the boxes in parameter space until they are sufficient small. In one embodiment of the present invention, determining when to stop the subdivision process is based on how the typical widths of corresponding objective function boxes change from iteration to iteration. For example, if at some point in the iteration process, the widths of objective functions evaluations $F_i(X_1, ..., X_d, Y_1, ..., Y_p)$ on the sub-boxes do not decrease with the decreasing widths of $(Y_1, ..., Y_p)$, but rather become more dependent on the fixed values of $(A_1, ..., A_d)$. In such a case, there is little to be gained from splitting further in parameter space. Rather, one needs to perform an outer iteration to split the design variable box $(A_1, ..., A_d)$.

Figure 5:
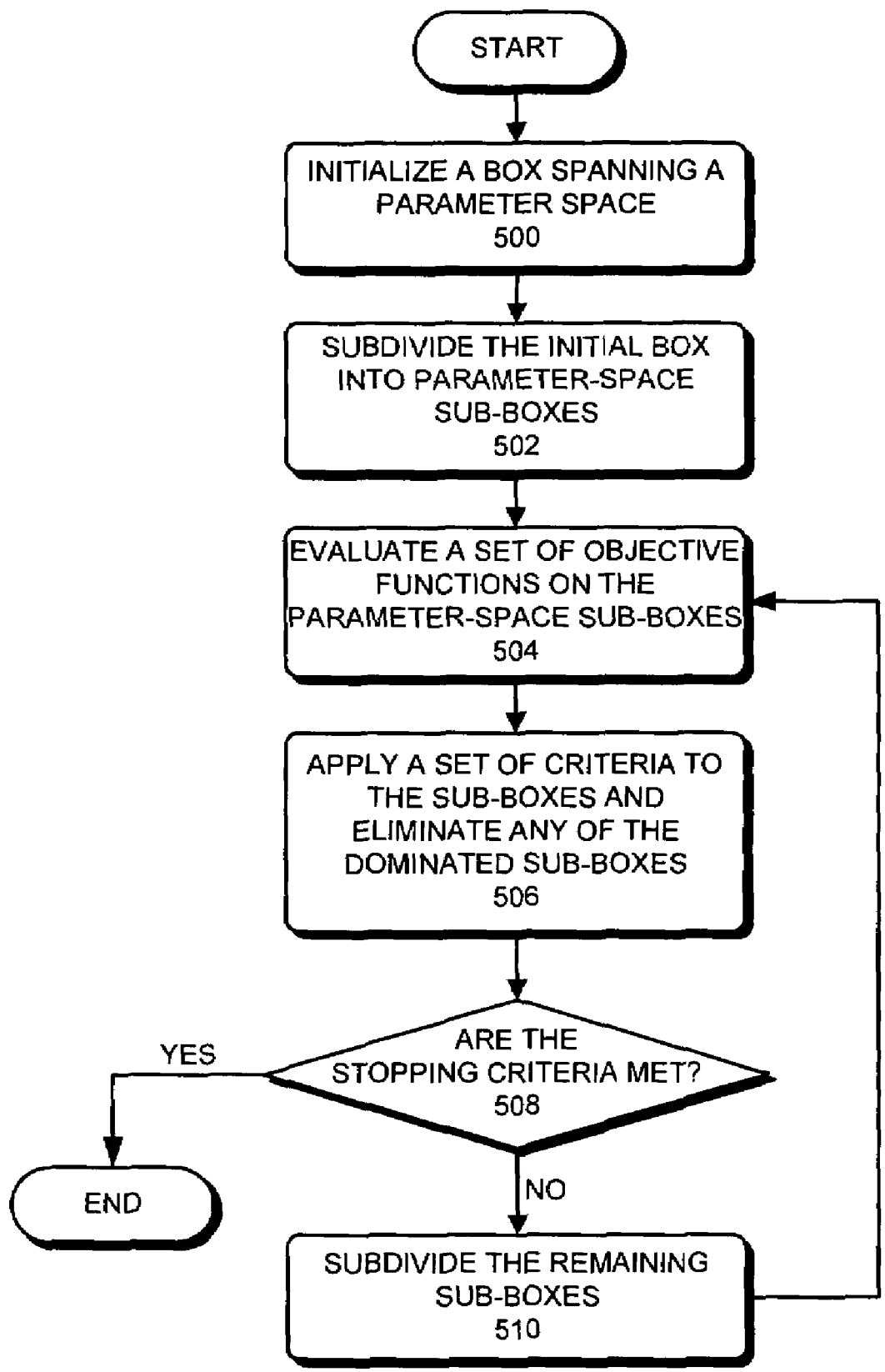
FIG. 5 presents a flowchart illustrating an optimization process for determining a parametric Pareto front for a given design variable box in accordance with an embodiment of the present invention.

FIG. 5 presents a flowchart illustrating an optimization process for determining a parametric Pareto front for a given design variable box in accordance with an embodiment of the present invention.

The iterative optimization process starts by initializing a box spanning the parameter space (step 500). The process then subdivides the initial box into parameter-space sub-boxes (step 502). In one embodiment of the present invention, subdividing the initial box splits the box into two parameter-space sub-boxes.

Next, the process evaluates the multiple-objective functions on the parameter-space sub-boxes (step 504). The process then applies a set of criteria to the parameter-space sub-boxes to eliminate any of these sub-boxes that are found to be dominated (step 506). There criteria can include, but are not limited to the aforementioned direct-comparison techniques and/or gradient techniques.

Next, the process determines if predetermining stopping criteria are met (step 508). If not, the process subdivides the remaining parameter-space sub-boxes (step 510). The process then repeats steps 504 to 510 until these predetermining stopping criteria are met.

Comparing Parametric Pareto Fronts Using Intervals

So far we have discussed using the interval techniques to eliminate boxes to obtain either the global Pareto front or a parametric Pareto front for a particular design space box $(A_1, ..., A_d)$. We now describe an interval technique for comparing parametric Pareto fronts and establish a criterion for eliminating the Pareto fronts using intervals.

We consider the parametric Pareto fronts associated with two design variable boxes, $A_i$ and $B_i$, which we denote as $P(A_i)$ and $P(B_i)$. Note that each of the two Pareto fronts is represented by a finite set of boxes which contains the actual parametric Pareto front for the parametric multi-objective optimization problem. Furthermore, we denote the parametric Pareto optimal sets associated with $P(A_i)$ and $P(B_i)$ as $S(A_i)$ and $S(B_i)$, respectively. Note that each of $S(A_i)$ and $S(B_i)$ is also represented by a finite set of boxes in the parameter space which contains the actual parametric Pareto optimal set for the parametric multi-objective optimization problem.

In order to eliminate the design variable box $B_i$ from further consideration, we need to show that the parametric Pareto front $P(A_i)$ associated with design variable box $A_i$ certainly dominates $P(B_i)$, which is denoted as: $P(A_i) \lessdot P(B_i)$. It helps to emphasize here that the boxes in parametric Pareto optimal set reside in parameter space and not in design space.

In the context of intervals, $P(A_i)$ certainly dominates $P(B_i)$ iff for every box $V_i \in S(B_i)$, there is at least one box $U_i \in S(A_i)$ such that:

$$F_i(A_1, \ldots, A_d; U_1, \ldots, U_p) \lessdot F_i(B_1, \ldots, B_d; V_1, \ldots, V_p) \quad i=1, \ldots, n.$$

Note that certain dominance pertains to a box (which is described in the related patent application) in the objective space can be used here. Specifically, if we define $G_i = F_i(A_1, \ldots, A_d; U_1, \ldots, U_p)$ and $H_i = F_i(B_1, \ldots, B_d; V_1, \ldots, V_p)$, which can be alternatively expressed in terms of their infima and suprema as $G_i = [\underline{g}_i, \overline{g}_i]$ and $H_i = [\underline{h}_i, \overline{h}_i]$, then $G_i \lessdot H_i$ if:

$$\overline{g}_i \leq \underline{h}_i, i=1, \ldots, n$$

and $\overline{g}_i < \underline{h}_i$ for some $i \in \{1, \ldots, n\}$.

Eliminating Pareto Fronts Based on Subjective Measures

As in the point case, there may be additional criteria for eliminating boxes in design space. These will most often relate to qualities of the associated parametric Pareto fronts, particularly in comparison to the global Pareto front. In fact, once the global Pareto front is determined, it may be helpful to generate parametric Pareto fronts for all the boxes in design space which map to the global Pareto front. This may provide a feel for how the subjective measures should be chosen.

Optimizing a Parametric Multi-Objective Problem Using Intervals

Figure 6:
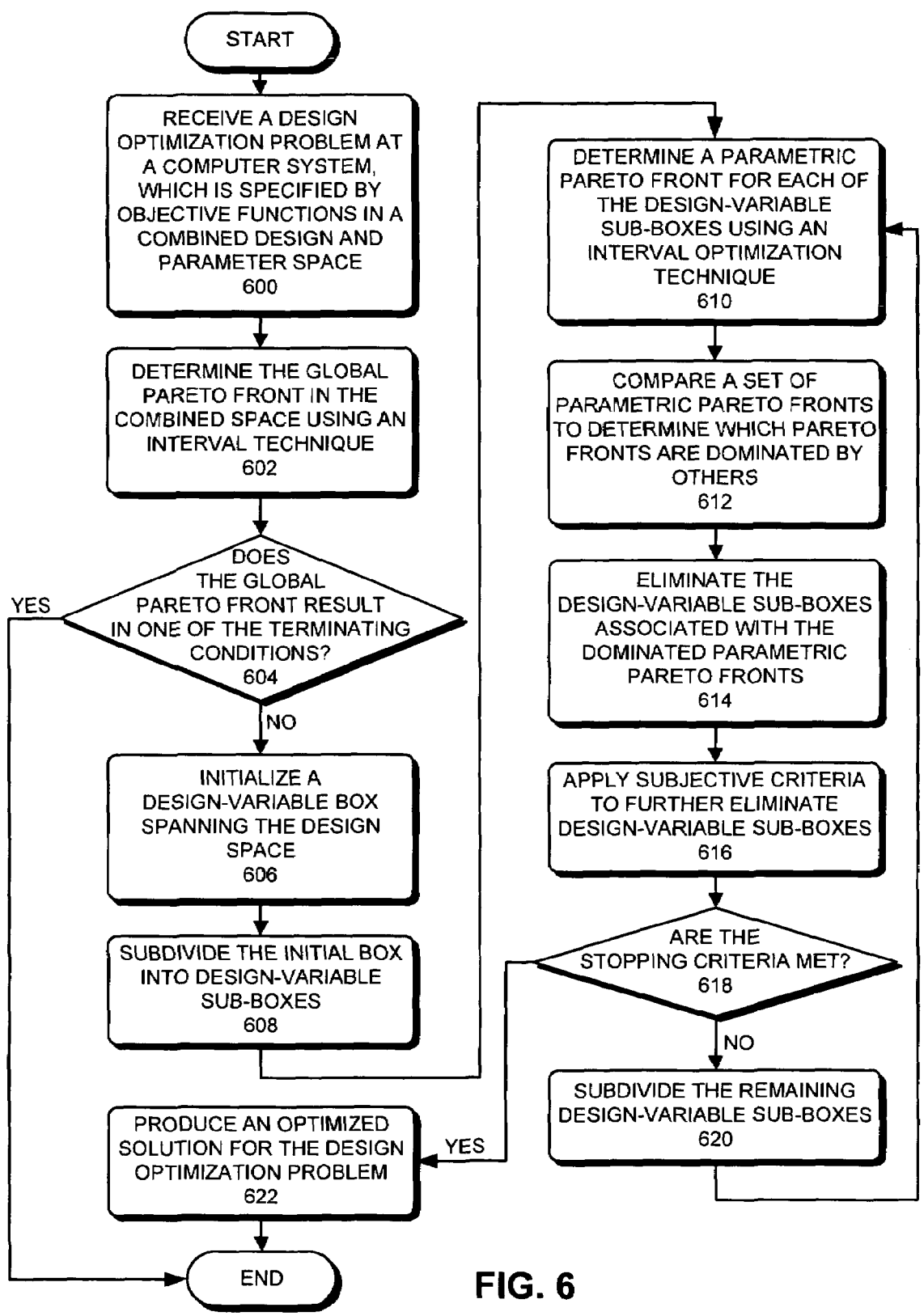
FIG. 6 presents a flowchart illustrating a process for solving a parametric multi-objective optimization problem in a combined design space and parameter space using interval techniques in accordance with an embodiment of the present invention.

FIG. 6 presents a flowchart illustrating a process for solving a parametric multi-objective optimization problem in a combined design space and parameter space using interval techniques in accordance with an embodiment of the present invention.

During operation, the process receives a design-optimization problem at a computer system, wherein the design-optimization problem is specified by multiple-objective functions which are to be optimized in the combined design space and parameter space (step 600). In one embodiment of the present invention, the design-optimization problem is the above-described airfoil design problem to maximize the lift while minimize the drag.

Next, the process determines the global Pareto front in the combined design space and parameter space using an interval technique (step 602). The process then determines if the global Pareto front results in one of the following terminating conditions (step 604), which are (1) the global Pareto front results from a single point in the combined design space and parameter space; (2) the global Pareto front results from a single point in the design space but different points in the parameter space; or (3) the global Pareto front results from a single point in the parameter space but different points in the design space. If so, the solution procedure is effectively completed.

Otherwise, the process initializes an interval optimization process by defining a single design variable box spanning the entire design space (step 606). The process next subdivides the initial design-variable box into design-variable sub-boxes (step 608). In one embodiment of the present invention, subdividing the initial design-variable box splits the box into two design-variable sub-boxes.

Next, the process performs the interval optimization process on the parameter space. Specifically, the interval optimization process determines a parametric Pareto front for each design-variable sub-box using an interval optimization technique (step 610). In one embodiment of the present invention, this interval optimization technique is the above-described process in FIG. 5. Note that computing a parametric Pareto front involves subdividing boxes in the parameter space.

Next, the interval optimization process compares a set of parametric Pareto fronts associated with a set of design-variable sub-boxes to determine which parametric Pareto fronts are certainly dominated by other parametric Pareto fronts (step 612). The interval optimization process then eliminates the design-variable sub-boxes associated which the parametric Pareto fronts which are certainly dominated by other parametric Pareto fronts (step 614).

The interval optimization process next applies a set of subjective criteria on the sub-boxes to facilitate further eliminating remaining design-variable sub-boxes (step 616).

Next, the interval optimization process determines if user specified stopping criteria are met (step 618). If not, the process subdivides remaining design-variable sub-boxes in the design space (step 620), and returns to step 610. The process subsequently repeats steps 610 to 620 until the user specified stopping criteria are met. Note that such stopping criteria can include, but are not limited to, when a predetermined maximum number of iterations are reached, or the largest size of any remaining design-variable sub-box is below a predetermined value.

When the interval optimization process is terminated, the main process can then produces an optimized solution for the design-optimization problem from the remaining design-variable sub-boxes and the associated parametric Pareto fronts (step 622).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer implemented method for solving a parametric multi-objective optimization problem in a combined design space and parameter space using interval techniques, wherein the design space contains design-space variables which are fixed for a selected design, and wherein the parameter space contains parameters which are variables for the selected design, the method comprising:
   receiving a design-optimization problem at a computer system, wherein the problem is specified by multiple-objective functions which are to be optimized in the combined design space and parameter space;
   initializing, using the computer system, a design-variable box spanning the design space;

performing, using the computer system, an interval optimization process on the parameter space by subdividing the design-variable box in the design space into design-variable sub-boxes, and:

determining, using the computer system, a parametric Pareto front for a design-variable sub-box using an interval optimization technique;

comparing, using the computer system, a set of parametric Pareto fronts associated with a set of design-variable sub-boxes to determine which parametric Pareto fronts are certainly dominated by other parametric Pareto fronts;

eliminating, using the computer system, the design-variable sub-boxes associated which the parametric Pareto fronts which are certainly dominated by other parametric Pareto fronts; and if predetermined stopping criteria are not met:

subdividing remaining design-variable sub-boxes; and repeating the determining, comparing and eliminating steps;

otherwise:

producing, using the computer system, an optimized solution for the design-optimization problem from the remaining design-variable sub-boxes and the associated parametric Pareto fronts.

2. The method of claim 1, wherein prior to performing the interval optimization process on the parameter space, the method further comprises:

determining a global Pareto front for the combined design space and parameter space by solving a nonparametric multiple-objective optimization problem, wherein the parameters are treated as additional design variables; and wherein the method is terminated if, the global Pareto front results from a single point in the combined design space and parameter space;

the global Pareto front results from a single point in the design space but different points in the parameter space; or the global Pareto front results from a single point in the parameter space but different points in the design space.

3. The method of claim 2, wherein if the global Pareto front results in a single value for a variable in the combined design space and parameter space, the method further comprises removing the variable from the optimization problem.

4. The method of claim 2, wherein the global Pareto front forms an upper bound for the parametric multiple-objective optimization problem.

5. The method of claim 1, wherein determining the parametric Pareto front for the design-variable sub-box involves:

subdividing the parameter space into parameter-space sub-boxes; and performing an iterative interval optimization process on the parameter-space sub-boxes until predetermining stopping criteria are met.

6. The method of claim 5, wherein performing the iterative interval optimization process involves:

evaluating the multiple-objective functions on the parameter-space sub-boxes;

applying a set of criteria to eliminate some of the parameter-space sub-boxes; and subdividing remaining parameter-space sub-boxes.

7. The method of claim 6, wherein the set of criteria to eliminate some of the parameter-space sub-boxes includes:

a direct comparison of the evaluation results on the multiple-objective functions; and a gradient technique.

8. The method of claim 5, wherein the predetermined stopping criteria include:

the change during successive evaluations on the multiple-objective functions as a result of further subdividing the remaining sub-boxes is less than a predetermined amount;

a predetermined maximum number of iterations is reached; or the largest size of any remaining sub-box is below a predetermined value.

9. The method of claim 1, wherein a parametric Pareto front for a design-variable sub-box is represented by a finite set of boxes which contains the actual parametric Pareto front for the parametric multi-objective optimization problem.

10. The method of claim 9, wherein a parametric Pareto front P(A) associated with a design-variable sub-box A certainly dominates a parametric Pareto front P(B) associated with a design-variable sub-box B, if:

for every box V∈S(B) there is at least one box U∈S(A) such that:

$F_i(A; U) \leq F_i(B; V)$, wherein i=1, . . . , n; and there is at least one combination of V∈S(B) and U∈S(A) such that: $F_i(A; U) < F_i(B; V)$ for some i∈{1, . . . , n}, wherein S(A) and S(B) are the Pareto optimal sets associated with the parametric Pareto fronts P(A) and P(B), respectively, and wherein $F_i$ are the set of multiple-objective functions.

11. The method claim 1, wherein the method further comprises applying a set of subjective elimination criteria to further eliminate remaining parametric Pareto fronts and the associated design-variable sub-boxes.

12. A computer-readable storage medium storing instructions that when executed by a computer cause the computer to perform a method for solving a parametric multi-objective optimization problem in a combined design space and parameter space using interval techniques, wherein the design space contains design-space variables which are fixed for a selected design, and wherein the parameter space contains parameters which are variables for the selected design, the method comprising:

receiving a design-optimization problem at a computer system, wherein the problem is specified by multiple-objective functions which are to be optimized in the combined design space and parameter space;

initiating a design-variable box spanning the design space;

performing an interval optimization process on the parameter space by subdividing the design-variable box in the design space into design-variable sub-boxes, and:

determining a parametric Pareto front for a design-variable sub-box using an interval optimization technique;

comparing a set of parametric Pareto fronts associated with a set of design-variable sub-boxes to determine which parametric Pareto fronts are certainly dominated by other parametric Pareto fronts;

eliminating the design-variable sub-boxes associated which the parametric Pareto fronts which are certainly dominated by other parametric Pareto fronts; and if predetermined stopping criteria are not met:

subdividing remaining design-variable sub-boxes; and repeating the determining, comparing and eliminating steps;

otherwise:

producing an optimized solution for the design-optimization problem from the remaining design-variable sub-boxes and the associated parametric Pareto fronts.

13. The computer-readable storage medium of claim 12, wherein prior to performing the interval optimization process on the parameter space, the method further comprises:
- determining a global Pareto front for the combined design space and parameter space by solving a nonparametric multiple-objective optimization problem, wherein the parameters are treated as additional design variables; and
- wherein the method is terminated if,
  - the global Pareto front results from a single point in the combined design space and parameter space;
  - the global Pareto front results from a single point in the design space but different points in the parameter space; or
  - the global Pareto front results from a single point in the parameter space but different points in the design space.

14. The computer-readable storage medium of claim 13, wherein if the global Pareto front results in a single value for a variable in the combined design space and parameter space, the method further comprises removing the variable from the optimization problem.

15. The computer-readable storage medium of claim 13, wherein the global Pareto front forms an upper bound for the parametric multiple-objective optimization problem.

16. The computer-readable storage medium of claim 12, wherein determining the parametric Pareto front for the design-variable sub-box involves:
- subdividing the parameter space into parameter-space sub-boxes; and
- performing an iterative interval optimization process on the parameter-space sub-boxes until predetermining stopping criteria are met.

17. The computer-readable storage medium of claim 16, wherein performing the iterative interval optimization process involves:
- evaluating the multiple-objective functions on the parameter-space sub-boxes;
- applying a set of criteria to eliminate some of the parameter-space sub-boxes; and
- subdividing remaining parameter-space sub-boxes.

18. The computer-readable storage medium of claim 17, wherein the set of criteria to eliminate some of the parameter-space sub-boxes includes:
- a direct comparison of the evaluation results on the multiple-objective functions; and
- a gradient technique.

19. The computer-readable storage medium of claim 16, wherein the predetermined stopping criteria can include:
- the change during successive evaluations on the multiple-objective functions as a result of further subdividing the remaining sub-boxes is less than a predetermined amount;
- a predetermined maximum number of iterations is reached; or
- the largest size of any remaining sub-box is below a predetermined value.

20. The computer-readable storage medium of claim 12, wherein a parametric Pareto front for a design-variable sub-box is represented by a finite set of boxes which contains the actual parametric Pareto front for the parametric multi-objective optimization problem.

21. The computer-readable storage medium of claim 20, wherein a parametric Pareto front $P(A)$ associated with a design-variable sub-box A certainly dominates a parametric Pareto front $P(B)$ associated with a design-variable sub-box B, iff:
- for every box $V \in S(B)$ there is at least one box $U \in S(A)$ such that:
- $F_i(A; U) \leq F_i(B; V)$, wherein $i=1, \ldots, n$; and
- there is at least one combination of $V \in S(B)$ and $U \in S(A)$ such that:
- $F_i(A; U) < F_i(B; V)$ for some $i \in \{1, \ldots, n\}$,
- wherein $S(A)$ and $S(B)$ are the Pareto optimal sets associated with the parametric Pareto fronts $P(A)$ and $P(B)$, respectively, and wherein $F_i$ are the set of multiple-objective functions.

22. The computer-readable storage medium of claim 12, wherein the method further comprises applying a set of subjective elimination criteria to further eliminate remaining parametric Pareto fronts and the associated design-variable sub-boxes.

23. An apparatus that solves a parametric multi-objective optimization problem in a combined design space and parameter space using interval techniques, wherein the design space contains design-space variables which are fixed for a selected design, and wherein the parameter space contains parameters which are variables for the selected design, comprising:
- a computer system with at least one processor and a memory storing a program of instructions;
- a receiving mechanism configured to receive a design-optimization problem at the computer system, wherein the problem is specified by multiple-objective functions which are to be optimized in the combined design space and parameter space;
- a initialization mechanism configured to initialize a design-variable box spanning the design space;
- an optimization mechanism configured to perform an interval optimization process on the parameter space by subdividing the design-variable box in the design space into design-variable sub-boxes, wherein while performing the interval optimization process, the optimization mechanism is configured to:
- determine a parametric Pareto front for a design-variable sub-box using an interval optimization technique;
- compare a set of parametric Pareto fronts associated with a set of design-variable sub-boxes to determine which parametric Pareto fronts are certainly dominated by other parametric Pareto fronts;
- eliminate the design-variable sub-boxes associated which the parametric Pareto fronts which are certainly dominated by other parametric Pareto fronts; and
- if predetermined stopping criteria are not met:
- subdivide remaining design-variable sub-boxes; and
- repeat the determining, comparing and eliminating steps; otherwise:
- a producing mechanism configured to produce an optimized solution for the design-optimization problem from the remaining design-variable sub-boxes and the associated parametric Pareto fronts.

* * * * *

UNITED STATES PATENT AND TRADEMARK OFFICE
CERTIFICATE OF CORRECTION

| | | |
|---|---|---|
| PATENT NO. | : 7,664,622 B2 | Page 1 of 1 |
| APPLICATION NO. | : 11/481747 | |
| DATED | : February 16, 2010 | |
| INVENTOR(S) | : Gregory R. Ruetsch | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

In claim 5 (at column 15, line 54), please replace the word "predetermining" with the word --predetermined--.

In claim 16 (at column 17, line 31), please replace the word "predetermining" with the word --predetermined--.

In claim 19 (at column 17, line 48), please delete the word "can".

Signed and Sealed this

Twenty-sixth Day of October, 2010

David J. Kappos
*Director of the United States Patent and Trademark Office*